United States Patent
Hamm et al.

(10) Patent No.: US 11,731,595 B2
(45) Date of Patent: Aug. 22, 2023

(54) EMERGENCY BRAKING SYSTEM OF A SINGLE-TRACK VEHICLE

(71) Applicant: Bayerische Motoren Werke Aktiengesellschaft, Munich (DE)

(72) Inventors: Markus Hamm, Ismaning (DE); Arne Purschwitz, Munich (DE); Josef Seidl, Strasskirchen (DE); Hans-Albert Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 16/751,413

(22) Filed: Jan. 24, 2020

(65) Prior Publication Data

US 2020/0156605 A1  May 21, 2020

Related U.S. Application Data

(63) Continuation of application No. PCT/EP2018/069342, filed on Jul. 17, 2018.

(30) Foreign Application Priority Data

Aug. 22, 2017 (DE) .................... 10 2017 214 586.2

(51) Int. Cl.
*B60T 8/17* (2006.01)
*B60T 7/12* (2006.01)
(Continued)

(52) U.S. Cl.
CPC .............. *B60T 8/1706* (2013.01); *B60T 7/12* (2013.01); *B60T 8/17558* (2013.01); *B60T 8/3225* (2013.01)

(58) Field of Classification Search
CPC ...... B60T 8/1706; B60T 7/12; B60T 8/17558; B60T 8/3225; B60T 2201/024;
(Continued)

(56) References Cited

U.S. PATENT DOCUMENTS 7,072,753 B2 *  7/2006  Eberle ................ G06K 9/00791
                                                      701/45
8,948,955 B2 *  2/2015  Zhu ......................... B60T 8/885
                                                      701/23
(Continued)

FOREIGN PATENT DOCUMENTS

CN      101073018 A    11/2007
CN      106660565 A     5/2017
(Continued)

OTHER PUBLICATIONS

German-language Search Report issued in German Application No. 10 2017 214 586.2 dated Dec. 4, 2020 with partial English translation (12 pages).
(Continued)

*Primary Examiner* — Thomas E Worden
*Assistant Examiner* — Daniel Tyler Reich
(74) *Attorney, Agent, or Firm* — Crowell & Moring LLP

(57) ABSTRACT

An emergency braking system of a single-track vehicle configured to intervene in a braking process of the single-track vehicle includes a plurality of sensors that determine various physical variables. From the physical variables an accident risk actual value is determined, compared with an accident risk target value using an emergency braking system control unit, and if the accident risk actual value exceeds the accident risk target value, the single-track vehicle's brake is actuated by the emergency braking system control unit.

12 Claims, 2 Drawing Sheets

(51) Int. Cl.
*B60T 8/1755* (2006.01)
*B60T 8/32* (2006.01)

(58) Field of Classification Search
CPC .......... B60T 2201/16; B60T 2210/32; B60T 2210/36; B60T 2230/03; B60T 2250/06; B60T 2270/86; B60T 7/22; G08G 1/166
See application file for complete search history.

(56) References Cited

U.S. PATENT DOCUMENTS

| | | | |
|---|---|---|---|
| 10,099,667 B2* | 10/2018 | Kajiyama | B60W 30/08 |
| 2004/0098185 A1 | 5/2004 | Wang | |
| 2013/0311075 A1 | 11/2013 | Tran et al. | |
| 2016/0297428 A1* | 10/2016 | Moerbe | B60T 8/1706 |
| 2016/0357187 A1* | 12/2016 | Ansari | G01S 13/862 |
| 2017/0247042 A1 | 8/2017 | Seidl | |
| 2020/0017086 A1* | 1/2020 | Oshida | B60K 28/14 |

FOREIGN PATENT DOCUMENTS

| | | |
|---|---|---|
| DE | 10 2007 053 274 A1 | 5/2009 |
| DE | 10 2012 220 355 A1 | 5/2014 |
| EP | 3 124 370 A2 | 2/2017 |
| WO | WO 2017/115371 A1 | 7/2017 |

OTHER PUBLICATIONS

International Search Report (PCT/ISA/210) issued in PCT Application No. PCT/EP2018/069342 dated Oct. 12, 2018 with English translation (six (6) pages).
German-language Written Opinion (PCT/ISA/237) issued in PCT Application No. PCT/EP2018/069342 dated Oct. 12, 2018 (six (6) pages).
Chinese-language Office Action issued in Chinese Application No. 201880041804.2 dated Jun. 2, 2021 with English translation (17 pages).
Chinese-language Office Action issued in Chinese Application No. 201880041804.2 dated Jan. 4, 2022 with English translation (13 pages).

* cited by examiner

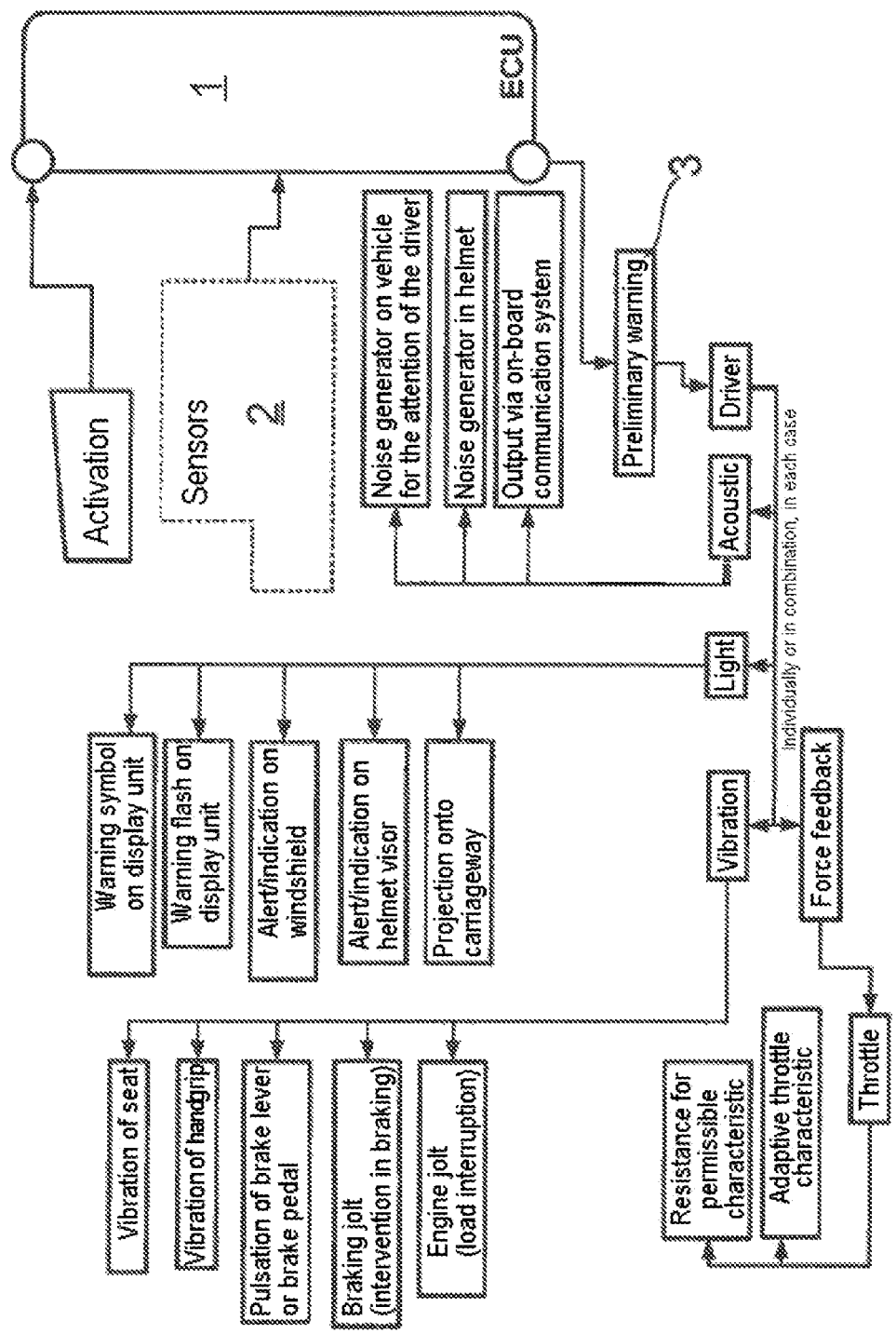

EMERGENCY BRAKING SYSTEM OF A SINGLE-TRACK VEHICLE

CROSS REFERENCE TO RELATED APPLICATIONS

This application is a continuation of PCT International Application No. PCT/EP2018/069342, filed Jul. 17, 2018, which claims priority under 35 U.S.C. § 119 from German Patent Application No. 10 2017 214 586.2, filed Aug. 22, 2017, the entire disclosures of which are herein expressly incorporated by reference.

BACKGROUND AND SUMMARY OF THE INVENTION

The invention relates to an emergency braking system of a single-track vehicle, which intervenes in the braking system or a brake of the single-track vehicle.

Various braking assistance systems are known from the prior art, the majority of which, however, cannot support braking in an emergency situation in accordance with environmental parameters of a vehicle. Moreover, the majority of known braking systems improve braking performance in general, but do not actively initiate a braking process in the event of an impending hazard. Additionally, emergency braking systems known from the prior art are not suitable for single-track vehicles such as, for example, motorcycles, motor scooters or other powered bikes, as the specific characteristics of single-track vehicles are not considered, and cannot be considered.

The object of the invention is therefore the provision of an emergency braking system, by means of which a single-track vehicle can be brought to a safe condition in an emergency situation.

According to the invention, an emergency braking system of a single-track vehicle is proposed, which intervenes in a brake or in a braking system of the single-track vehicle. The emergency braking system comprises a plurality of sensors which detect various physical variables, at least one sensor evaluation unit which is connected to one sensor of the plurality of sensors, and an emergency braking system control unit which is connected to the sensor evaluation unit. A physical variable is a property of a physical object, process or state which is quantitatively determinable by the respective sensor. The value of the physical variable is comprised of a numerical value and a unit of measurement, wherein the numerical value is delivered by the respective sensor in the form of a sensor signal, and the unit of measurement for the respective sensor signal is saved in the at least one sensor evaluation unit and/or in the emergency braking system control unit and/or is considered in the evaluation. The various physical variables respectively indicate one or more physical variables for mutually distinct objects, processes or states. The respective sensor of the plurality of sensors delivers the physical variable detected thereby to the sensor evaluation unit in the form of an analog or digital sensor signal. From the sensor signals of the plurality of sensors, the instantaneous status of the single-track vehicle and the instantaneous status of its environment, together with the behavior of the single-track vehicle vis-à-vis the environment upon the transition of the single-track vehicle to a safe condition, are determined. On the basis of known behaviors of the single-track vehicle, a model of the single-track vehicle can be generated, which can be compared with its instantaneous status in order to generate additional information on the single-track vehicle and the anticipated behavior of the single-track vehicle. Likewise, a model of the environment can be employed, by means of a comparison with the instantaneous status of the environment, to generate information on the environment and the anticipated behavior of the environment. By reference to the instantaneous statuses determined by the sensors, the models can be corrected and improved. A safe condition, in the case of a single-track vehicle, is defined as the stationary condition of the vehicle, wherein the vehicle is essentially upright, rather than in the laid-down position. In order to permit conclusions to be drawn from the sensor signal of the respective sensor with respect to the status of the single-track vehicle and the environment of the single-track vehicle, the sensor signal of the sensor is evaluated by the respective sensor evaluation unit, and at least one risk value is determined from the respective sensor signal. The sensor evaluation unit delivers the at least one risk value to the emergency braking system control unit. The sensor evaluation unit can relay the sensor signal in an unchanged form, by way of a risk value, can convert the sensor signal, in accordance with a predefined evaluation scheme, into a risk value which deviates from the sensor signal, or can convert the sensor signal, according to a predefined formula or with the aid of the model of the single-track vehicle or the environment, into a risk value which deviates from the sensor signal. The sensor signal, for example image data from a camera, can also be converted by the sensor evaluation unit into a plurality of risk values, for example into motion vectors of a plurality of objects based upon a plurality of camera images, wherein a plurality of risk values, in the form of intermediate values, can also be combined by the sensor evaluation units into a single risk value. Moreover, the sensor signal and/or a risk value can be subject to intermediate storage, in order to permit the comparison of subsequent sensor signals and/or risk values with the previous sensor signals and/or risk values. For example, an accident probability can be determined from the motion vectors, wherein the speed and the motion vector of the single-track vehicle are compared with the speeds and motion vectors of the objects in the environment of the single-track vehicle, and are extrapolated using the models of the single-track vehicle and the environment. Thereafter, from the motion vectors, a collision probability is determined, wherein it is established whether the motion vectors of the single-track vehicle and the objects intersect and whether, on the grounds of their respective speed, they are simultaneously located at or close to the intersection point. From a plurality of collision probabilities, it is also possible for only the highest collision probability to be relayed by way of a risk value. The at least one risk value is weighted by the emergency braking system control unit, in accordance with the sensor signals from which it has been determined, is evaluated by the emergency braking system control unit, and an accident risk actual value is determined from all the risk values. A risk value can, for example, depending upon the sensor which detects the sensor signals from which the risk value is determined, carry a larger or a smaller weighting, in comparison with other risk values. From a plurality of risk values, new risk values can be determined, in order to define the status of the single-track vehicle. For example, from the speed, the inclination, the course of the road, the previous motion vector and the model of the single-track vehicle, the putative future motion vector can be determined, wherein, by way of sources for the individual data or risk values, various sensors and data sources can be employed. For the appraisal of accident probability, the emergency braking system, from all the risk values, determines the accident risk actual value, wherein, in parallel, the emergency braking system can also determine a plurality of accident risk actual values, of which e.g. a first accident risk actual value, which considers the accident probability of a collision, and a second accident risk actual value, which considers the accident probability associated with the loss of carriageway traction by the tires of the single-track vehicle. The accident risk actual value is compared with an accident risk target value by the emergency braking system control unit. In the event of a plurality of accident risk actual values, these can be compared with an accident risk target value, or with a plurality of accident risk target values. In the event that the accident risk actual value exceeds the accident risk target value, the brake is actuated by the emergency braking system control unit, in accordance with the sensor signals from the plurality of sensors.

The environment of the single-track vehicle is the respective region around the single-track vehicle which is detected by sensors. Different sensors can determine physical variables in subregions of the overall environment of the single-track vehicle, from which a model of the environment, which is not required to correspond to the complete environment, is determined and/or corrected.

Specifically, in an advantageous form of embodiment, the seating and body position of the driver and the passenger are detected. From the seating and body position detected, prior to braking, the bracing of the driver and the passenger on the single-track vehicle, conversely to a braking force, is determined. As the driver and the passenger, in the event of insufficient bracing for the braking force, will be surprised by the deployment of said braking force, the driver and the passenger can be prepared by warning means, or by preliminary braking, prior to the actual intervention in the brake for the braking of the single-track vehicle. A target braking force characteristic, by which intervention in the brake of the vehicle is controlled, can take account of the bracing of the driver and the passenger and can increase the latter, wherein the target braking force characteristic initially provides for a short braking of the machine, by which the bracing of the driver and/or the passenger on the single-track vehicle is increased, before the single-track vehicle executes the transition to the safe condition. If, by the detection of the seating and body position of the driver and/or the passenger, it is determined that the bracing thereof, even after the commencement of the braking process, by intervention in the brake, is not sufficient to bring the driver and/or the passenger to the safe condition, together with the single-track vehicle, a maximum target braking force characteristic is determined, by which the driver and/or the passenger, by bracing, can still remain on the single-track vehicle. Accordingly, any unseating of the driver and/or the passenger over the front of the single-track vehicle is prevented, at least until such time as the single-track vehicle collides with an obstacle.

In an advantageous further development of the emergency braking system, the at least one sensor evaluation unit and the emergency braking system control unit are constituted by a single control device. Alternatively, the sensors of the plurality of sensors, each having a sensor evaluation unit, constitute a sensor unit. Processing, and the requisite computing capacity for this purpose, can thus be distributed in a centralized or decentralized manner.

The sensor evaluation unit and/or the emergency braking system control unit can be configured as dedicated microcontrollers, or in the form of standalone control electronics or, alternatively, can be integrated in existing control devices.

In an advantageous form of embodiment, the emergency braking system can be activated by a driver input, or by the start-up of the single-track vehicle. Moreover, it can also be deactivated by a driver input.

In order to permit the sufficiently rapid determination or correction of the status or the model of the single-track vehicle and the environment, such that prompt intervention in the brake of the single-track vehicle is possible, it is necessary for the sensors to detect the physical variables in a continuous, or at least a virtually continuous, manner. Consequently, a form of embodiment is advantageous, in which the sensor signals from the plurality of sensors and/or the at least one risk value are/is evaluated and/or determined continuously in time, or at intervals which are less than or equal to 100 ms. In the interests of the more rapid response of the emergency braking system, even smaller intervals, e.g. in the region of 1 to 50 ms, can be chosen, or the intervals can be dynamically varied in accordance with the models of the single-track vehicle and the environment, or in accordance with a sensor.

As the behavior of the single-track vehicle in the event of an intervention in one or both brakes of said single-track vehicle is strongly dependent upon the driver and, where present, upon a passenger or pillion rider of the single-track vehicle, a further advantageous form of embodiment provides that the driver or, alternatively, the driver and the pillion rider are warned before and/or during the intervention of the emergency braking system in the brake(s) of the single-track vehicle. Additionally, persons in the environment, such as passers-by or vehicle drivers, can be warned about the impending or currently active intervention of the emergency braking system in the brakes of the single-track vehicle, in order to further reduce the probability of an accident. To this end, in the event of an overshoot of a warning value by the accident risk actual value, warning means can be actuated by the emergency braking system control unit. The warning value is chosen to be less than or equal to the accident risk target value.

In an advantageous further development, in the event of an overshoot of the warning value, which is lower than the accident risk target value, by the accident risk actual value, driver warning means, by way of warning means for the warning of the driver, can be actuated by the emergency braking system control unit. In the event of an overshoot of the accident risk target value by the accident risk actual value, environmental warning means, by way of warning means for the warning of persons in the environment of the single-track vehicle, can be actuated by the emergency braking system control unit. By means of the driver warning means, the driver or pillion rider can be prepared for the intervention in the brakes, such that they can behave accordingly, or can be alerted to the impending intervention. By alerting the driver to the hazard, it is possible for the driver to avert the latter, without the necessity for an intervention of the emergency braking system in the brakes of the single-track vehicle. By means of the environmental warning means, persons in the environment of the single-track vehicle are alerted to the intervention of the emergency braking system. As a result, the impending accident, on the grounds of which the emergency braking system intervenes in the brakes, can be prevented, or the severity of the accident can at least be reduced. Moreover, by means of the environmental warning means, the probability of follow-on accidents to the impending accident, which can result from said impending accident, is reduced, on the grounds that, for example, following vehicles are warned, and can thus undertake early braking or evasive action.

In an advantageous form of embodiment, the driver warning means is a vibrating element which acts on the driver, a first acoustic signal or a first light signal, and the environmental warning means is a second acoustic signal or a second light signal which is transmitted by the single-track vehicle to the environment. The driver warning means can be constituted integrally by the emergency braking system control unit and the brake of the single-track vehicle, wherein the emergency braking system control unit, for the warning of the driver or the pillion rider, actuates the brake or intervenes in the brake, and thus generates a short braking delay on the single-track vehicle, or a braking jolt. Alternatively or additionally, the emergency braking system control unit can be connected to the engine control system and, for the warning of the driver or the pillion rider, can initiate a short load interruption on the engine, such that the driver or the pillion rider experience an engine jolt.

In order to adjust the threshold for the intervention of the emergency braking system to the requirements or the knowledge of the driver, a further advantageous variant of embodiment provides that the accident risk target value and/or the warning value are/is adjustable by means of a driver input and/or in a sensor signal-dependent manner.

In a further development of the emergency braking system, prior to the actuation of the brake, a road distance within which the single-track vehicle is to be brought to a halt, a requisite slow-down of the single-track vehicle by the brake within said road distance, and a target braking force characteristic for the achievement of the requisite slow-down over said road distance are determined. The road distance, the slow-down and the target braking force characteristic are determined on the basis of the sensor signals from the plurality of sensors or the model of the single-track vehicle and/or the environment, in order to bring the single-track vehicle to a halt within said road distance. In the event of intervention in a plurality of brakes of the single-track vehicle, a specific target braking force characteristic can be determined for each brake. Said road distance, slow-down and target braking force characteristic, upon the actuation of the brake, are dynamically adjusted on the basis of the sensor signals from the plurality of sensors, or on the basis of the model of the single-track vehicle and/or the model of the environment. Upon actuation, the braking force of the brake is actuated to track the target braking force characteristic.

In one variant of embodiment of the emergency braking system, the road distance is determined from a distance to an obstacle detected by a first sensor of the plurality of sensors, and the target braking force characteristic is determined from the road distance and from a carriageway friction coefficient detected by a second sensor of the plurality of sensors.

The sensors of the plurality of sensors advantageously originate, in each case, from a group of sensor types comprising speed sensors, GPS sensors or GPS receivers, distance sensors, inclination sensors, acceleration sensors, rotational angle sensors, current consumption sensors, temperature sensors, cameras and microphones, together with transmitters and receivers for vehicle-to-vehicle communications.

The sensor signal of the sensor of the plurality of sensors, in an advantageous variant of the emergency braking system, in the evaluation thereof for the determination of the at least one risk value, is compared with map data or database data. Additionally or alternatively, the risk value, in the evaluation thereof for the determination of the accident risk actual value, can also be compared with map data or database data. The model of the single-track vehicle, the model of the environment and the changing statuses of the models and sensors over time can likewise be compared with map data or database data.

The instantaneous status of the single-track vehicle and the environment is constituted from individual substatuses, which can be determined by various sensors. From said substatuses, criteria for the appraisal of the accident risk actual value and the risk values can be deduced. Risk values of this type, with associated sensors for the determination of statuses and criteria, can include the following:

The speed of the single-track vehicle and the permissible maximum speed on the carriageway, determined from the speed sensor, map data, the GPS sensor and the camera, for the appraisal of compliance with road traffic regulations.

Brakelight detection determined from the camera evaluation, for the predictive calculation of the motion vector of preceding vehicles and the determination of the collision hazard.

Weave detection determined from the camera evaluation, for the comparison of the previously observed behavior of the driver with a maneuver database, which has been constituted during previous journeys, for the appraisal of the accident probability in the maneuver executed.

Detection of following vehicles from a rear-facing camera, in order to determine the accident hazard posed to the single-track vehicle by following vehicles.

Brightness of the environment, determined by a brightness sensor or camera, in order to determine a corrective factor for the correction of the accident probability, depending upon the probability that the single-track vehicle will be overlooked.

Road characteristics, determined from map resources and GPS receivers, in order to determine the accident probability on the stretch of road ahead, on the basis of driver behavior and the status of the single-track vehicle.

Gradients on the carriageway, determined by an inclination sensor, in order to permit the consideration of gradients in the calculation of the braking distance or the determination of the road distance within which the single-track vehicle is to be brought to a halt.

Lateral inclination of the single-track vehicle, determined by an inclination sensor, in order to determine the probability of the lateral skidding of the single-track vehicle, and to permit the determination of the braking distance.

Driver intent, from the maneuver database, in order to anticipate driver behavior and the maneuver executed and dynamically adjust the accident risk target value.

Driver bracing (hands-on/off detection), determined from oscillation analysis by means of an oscillation sensor, by means of a rotational angle sensor about a steering axis, an acceleration sensor on the handlebars, a temperature sensor on the handgrips, or by a current sensor on the handlebars, in order to adjust braking behavior, the warning value, the accident probability target value or the accident probability actual value to the bracing of the driver.

Pillion rider bracing determined from an inductive current sensor in the seat, in order to permit the position of the pillion rider to be concluded, and to adjust the braking force characteristic to the bracing of the pillion rider.

State of the carriageway, determined from a spring deflection sensor, in order to adjust the braking distance to the state of the carriageway or roadway.

Friction coefficient determined from weather data sourced from a non-locally saved weather database, image evaluation, a carriageway database or the ABS cloud, for the adjustment of the road distance within which the single-track vehicle is to be brought to a halt.

Braking temperature determined by a temperature sensor, in order to take account of the friction coefficient of the brake lining of the brakes for the target braking force characteristic.

Loading status of the single-track vehicle, determined from a spring deflection sensor, in order to adjust the model of the single-track vehicle.

Collision detection with reference to previous traffic, determined by acoustic sensors, in order to permit the consideration of previous accidents by the incorporation of a risk value in the calculation of the accident probability actual value.

The features disclosed above can be combined as required, insofar as this is technically possible, and said features are not mutually exclusive.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a schematic layout of the warning means.

The figures are example schematic representations. In the figures, identical reference numbers identify identical functional and/or structural features.

DETAILED DESCRIPTION OF THE DRAWINGS

Figure 1:
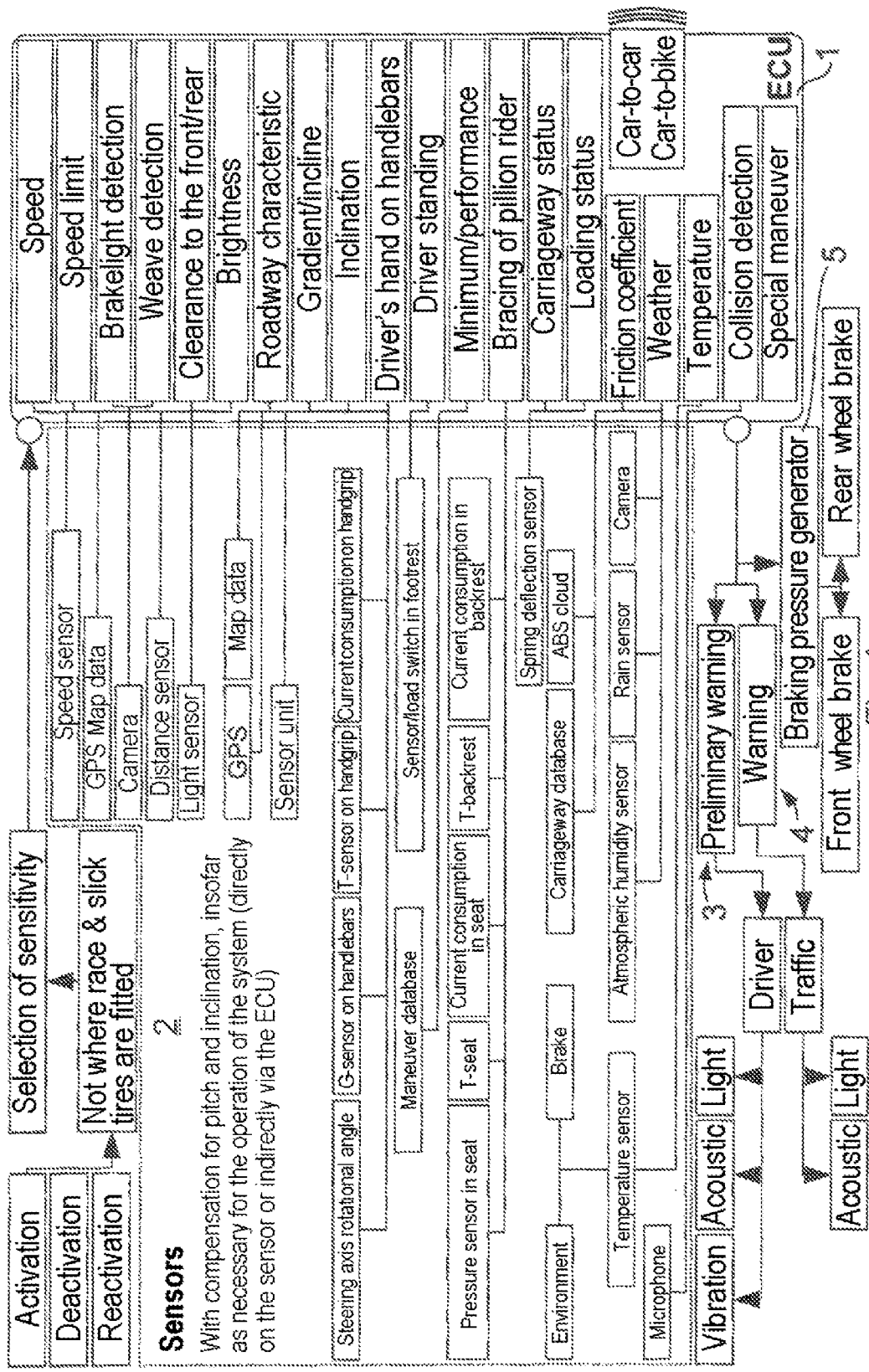
FIG. 1 shows a schematic layout of the emergency braking system.

FIG. 1 shows a schematic layout of the emergency braking system. In the form of embodiment represented in FIG. 1, activation of the system is only possible if no special "race & slick" tires are fitted to the single-track vehicle, which fitting will be saved in the single-track vehicle by way of a data source. After activation, in ECU 1 (the electronic control unit or control device), the specified risk values are determined. The risk values, such as speed, the speed limit (speed restriction), brakelight detection, etc. are determined by the plurality of sensors 2, each of which is integrally configured with a sensor evaluation unit. Bracing of the pillion rider is determined, for example, by a pressure sensor in the seat, a temperature sensor in the seat (T-seat), a current consumption sensor in the seat, a temperature sensor in the backrest (T-backrest) and a current consumption sensor in the backrest (Current consumption in backrest). From the plurality of risk values, the ECU 1 determines the accident risk actual value. If the accident risk actual value exceeds a warning value, a preliminary warning 3 is triggered by the driver warning means, in order to warn the driver. If the accident risk actual value exceeds the accident risk target value, a warning 4 is triggered by the environmental warning means, in order to warn persons in the environment of the single-track vehicle. Additionally to the warning 4, the braking pressure generator 5 is actuated, and thus intervenes in the brake. The braking pressure generator 5 is actuated such that the braking pressure, and thus the braking force of the brake, follows the braking force characteristic stipulated by the ECU 1.

FIG. 2 shows a schematic layout of the driver warning means for warning the driver of the single-track vehicle. Further to the activation of the emergency braking system, if the accident risk actual value exceeds the warning value, the ECU 1 triggers a preliminary warning 3 to the drive by warning means, which is executed in the form of various acoustic, light and vibration signals, together with feedback to the driver in the form of a variable force (force feedback) on the throttle grip of the single-track vehicle.

The invention is not limited in its execution to the preferred embodiments described above. Instead, a number of variants are conceivable, which employ the solution disclosed herein, albeit in fundamentally differently executed embodiments. For example, the emergency braking system might be configured not to bring the single-track vehicle to a halt, but to a state which is controllable by the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An emergency braking system of a single-track vehicle, which intervenes in a brake of the single-track vehicle, comprising:
   a plurality of sensors, each sensor of the plurality of sensors being configured to detect at least one of a plurality of physical variables;
   at least one sensor evaluation unit connected to at least one sensor of the plurality of sensors; and
   an emergency braking system control unit connected to the at least one sensor evaluation unit, wherein the plurality of sensors includes one or both of a driver bracing sensor and a pillion bracing sensor,
   the at least one sensor of the plurality of sensors connected to the at least one sensor evaluation unit is configured to send a sensor signal associated with at least one of the plurality of the physical variables to the at least one sensor evaluation unit, the sensor signal including a signal indicative of a level of bracing of one or both of the driver and a passenger on the pillion generated by one or both of the driver sensor and the pillion bracing sensor,
   the at least one sensor evaluation unit is configured to determine from the sensor signal at least one risk value and to send the at least one risk value to the emergency braking system control unit,
   the emergency braking system control unit is configured to
   weight the at least one risk value, and
   determine an accident risk actual value using the at least one risk value resulting from the weight determined by the emergency braking system control unit,
   compare the accident risk actual value with an accident risk target value,
   determine from sensor signals from the plurality of sensors, including the sensor signal from the at least one sensor, a road distance in which the single-track vehicle is to be stopped and a target braking force characteristic to obtain a vehicle deceleration that results is stopping of the single-track vehicle within the road distance, the vehicle deceleration being no greater than a deceleration above which one or both of the driver and the passenger on the pillion would become unseated from the single-track vehicle while the brake is decelerating the vehicle determined from the level of bracing, and
   when the accident risk actual value exceeds the accident risk target value, to initiate actuation of the brake, and after initiation of actuation of the brake by the emergency braking system control unit, control a braking force of the brake to control an actual braking force characteristic to the target braking force characteristic.

2. The emergency braking system according to claim 1, wherein the at least one sensor evaluation unit and the emergency braking system control unit are constituents of a single control device, or
at least a portion of the plurality of sensors each have a sensor evaluation unit and are integrated in a sensor unit.

3. The emergency braking system according to claim 1, wherein the emergency braking system is activatable by a driver input or by start-up of the single-track vehicle.

4. The emergency braking system according to claim 1, wherein the at least one sensor evaluation unit is configured to evaluate sensor signals from the plurality of sensors, including the sensor signal from the at least one sensor, either continuously in time or at intervals which are less than or equal to 100 ms.

5. The emergency braking system according to claim 1, wherein the emergency braking system control unit is configured to evaluate the at least one risk value are evaluated and/or determined continuously in time or at intervals which are less than or equal to 100 ms.

6. The emergency braking system according to claim 1, wherein the emergency braking system control unit is configured such that in an event of the accident risk actual value exceeding a warning value which is less than or equal to the accident risk target value, the emergency braking system control unit initiates actuation of a warning.

7. The emergency braking system according to claim 6, wherein initiation of actuation of the warning by the emergency braking system control unit includes actuating a warning to the driver and an environmental warning to persons in an environment of the single-track vehicle.

8. The emergency braking system according to claim 7, wherein the warning is at least one of a vibrating element acting on a driver, a first acoustic signal, a first light signal, a braking jolt generated by the brake or a load interruption on an engine of the single-track vehicle, and
the environmental warning is at least one of a second acoustic signal and a second light signal.

9. The emergency braking system according to claim 6, wherein the accident risk target value and/or the warning value are/is adjustable by a driver input and/or in a sensor signal-dependent manner.

10. The emergency braking system according to claim 1, wherein the emergency braking system control unit is configured to determine the road distance in which the single-track vehicle is to be stopped from a distance to an obstacle sensed by a first sensor of the plurality of sensors, and
the target braking force characteristic is determined from the road distance in which the single-track vehicle is to be stopped and from a road friction coefficient sensed by a second sensor of the plurality of sensors.

11. The emergency braking system according to claim 1, wherein the plurality of sensors include sensors from a group of sensor types that includes speed sensors, GPS sensors, distance sensors, inclination sensors, acceleration sensors, rotational angle sensors, current consumption sensors, temperature sensors, cameras and microphones.

12. The emergency braking system according to claim 1, wherein determination of the accident risk actual value includes comparison of at least one sensor signal with at least one of map data and database data.

* * * * *